United States Patent [19]

Sedlmayr et al.

[11] Patent Number: 4,615,540
[45] Date of Patent: Oct. 7, 1986

[54] SAFETY BELT SYSTEM

[75] Inventors: Gerhard Sedlmayr, Hamburg; Herbert Just, Hohnstorf, both of Fed. Rep. of Germany

[73] Assignee: Autoflug GmbH, Rellingen, Fed. Rep. of Germany

[21] Appl. No.: 688,843

[22] Filed: Jan. 4, 1985

[30] Foreign Application Priority Data

Jan. 4, 1984 [DE] Fed. Rep. of Germany ....... 3400115

[51] Int. Cl.$^4$ ............................................ B60R 21/10
[52] U.S. Cl. ................................. 280/806; 242/107.2; 297/480
[58] Field of Search ................. 180/268; 280/806, 807, 280/808; 297/480, 477, 478; 242/107.2

[56] References Cited

U.S. PATENT DOCUMENTS

| 2,771,128 | 11/1956 | Doolittle | 297/480 X |
| 3,389,873 | 6/1968 | Filipi et al. | 297/478 X |
| 3,879,054 | 4/1975 | Lindblad | 297/480 |
| 4,163,530 | 8/1979 | Kondo et al. | 242/107.2 X |
| 4,232,886 | 11/1980 | Tsuge et al. | 280/806 |
| 4,424,509 | 1/1984 | Andres et al. | 280/806 X |
| 4,447,018 | 5/1984 | Higbee | 242/107.2 |
| 4,458,921 | 7/1984 | Chiba et al. | 280/806 |

FOREIGN PATENT DOCUMENTS 2360160 8/1974 Fed. Rep. of Germany ...... 280/806

Primary Examiner—John J. Love
Assistant Examiner—Charles R. Watts
Attorney, Agent, or Firm—Becker & Becker, Inc.

[57] ABSTRACT

A safety belt system, especially for vehicles. The system has a three-point safety belt, a self-locking belt winding mechanism which is mounted on a structural part of the vehicle, and a clamping mechanism for the belt. The clamping mechanism is disposed on the structural part of the vehicle, and has at least one movable clamping jaw. The problem with a basic safety belt system of this type is that in particular the slack in the belt at the body of the strapped-in person, together with the belt elongation which additionally results due to the stretching of the belt, lead, upon activation of the clamping effect, to a forward shifting of the body, thus endangering the person who is strapped in. This problem is inventively solved by movably guiding the clamping mechanism on the structural part of the vehicle, and by providing a drive or control mechanism for the movement of the clamping mechanism.

19 Claims, 4 Drawing Figures

SAFETY BELT SYSTEM

BACKGROUND OF THE INVENTION

1. Field of the Invention

The present invention relates to a safety belt system, especially for vehicles, and includes a three-point safety belt, a self-locking belt winding mechanism which is mounted to a structural part of the vehicle, and, also disposed on a structural part of the vehicle, a clamping mechanism for the belt, which clamping mechanism has at least one movable clamping jaw.

2. Description of the Prior Art

With safety belt systems having a three-point safety belt and a self-locking belt winding mechanism for preventing the belt from being withdrawn any further, there generally exists in the event of an accident the following problem: When an accident occurs, the belt is customarily arrested in the belt winding mechanism, i.e. at a location which is relatively far from that section of the belt which contacts the body of the person who is strapped in. As a result, a relatively long length of the belt exists between the arresting location and that section of the belt which extends over the person. In addition to the slack which results when the belt is put on, and in addition to the stretching of the belt which results in the vicinity of the body of the person, the stretching of the belt which results under the influence of the forces occurring during an accident produce an elongation of the belt.

A further belt elongation results from the so-called feed-roll effect in the belt winding mechanism; this is explained by the fact that the more or less tight windings of the belt, which is wound by the winding spring on the pertaining shaft, could actually be wound considerably tighter with the use of appropriate forces, so that when wound normally, a strong pull on the belt must result in a tightening of the previously undertaken belt winding accompanied by a simultaneous release of a corresponding length of the belt.

Taken altogether, there is thus produced a considerable elongation of the belt, which in the event of an accident permits a preliminary shifting of the strapped-in body, thus endangering the person who is thus strapped in.

As one solution of this problem, German Offenlegungsschrift No. 25 40 302 discloses a safety belt system of the aforementioned general type, according to which the upper mounting or guide fitting for the belt is at the same time equipped with a clamping mechanism which clamps the belt when appropriate tension is exerted thereon, thus preventing the belt from sliding further through the fitting. In this manner, there can be reduced the consequences of the feed-roll effect which occurs in the belt winding mechanism, as well as the elongation of the belt in the region between the belt winding mechanism and the guide fitting, which elongation otherwise occurs upon failure of a clamping mechanism.

However, the following drawback is characteristic of this heretofore known proposal: Since the clamping action of the clamping mechanism of the known safety belt system is activated only in cooperation with the arresting of the belt winding mechanism, at the time point that the clamping action is initiated the belt has generally already slipped through the clamping mechanism and the guide fitting due to the necessary reaction time in the self-locking belt winding mechanism. As a result, the slack in the belt at the body of the person who is strapped in is increased even more, thus enhancing shifting of the person and endangering the latter.

To eliminate this drawback, it was proposed, in German Offenlegungsschrift No. 30 40 667, to dispense with the belt clamping mechanism and in place thereof provide a tightening mechanism which engages the shaft of the belt winding mechanism and turns the latter in the event of an accident counter to the direction in which the belt is moved for withdrawal of the same from the belt winding mechanism; in this way, the belt is wound onto the winding shaft and hence tightened, at the same time eliminating the feed-roll effect.

However, there is associated with this heretofore known mechanism the drawback that on the one hand the belt slack at the body of the strapped-in person can at most be only slightly eliminated, because the tightening and the winding forces for overcoming the friction of the belt at the point where it is reversed as well as at the body of the strapped-in person are hardly sufficient, and that on the other hand after the belt has been tightened and the belt winding mechanism has been arrested, an elongation of the safety belt still occurs due to the stretching of the belt as a result of the load which is encountered.

It is therefore an object of the present invention to improve a safety belt system of the aforementioned general type in such a way that while eliminating the belt slack at the body of the strapped-in person, at the same time the belt elongation is reduced to such an extent that a preliminary shifting of the strapped-in person is extensively precluded.

BRIEF DESCRIPTION OF THE DRAWINGS

This object, and other objects and advantages of the present invention, will appear more clearly from the following specification in conjunction with the accompanying drawings, in which.

SUMMARY OF THE INVENTION

Figure 1:
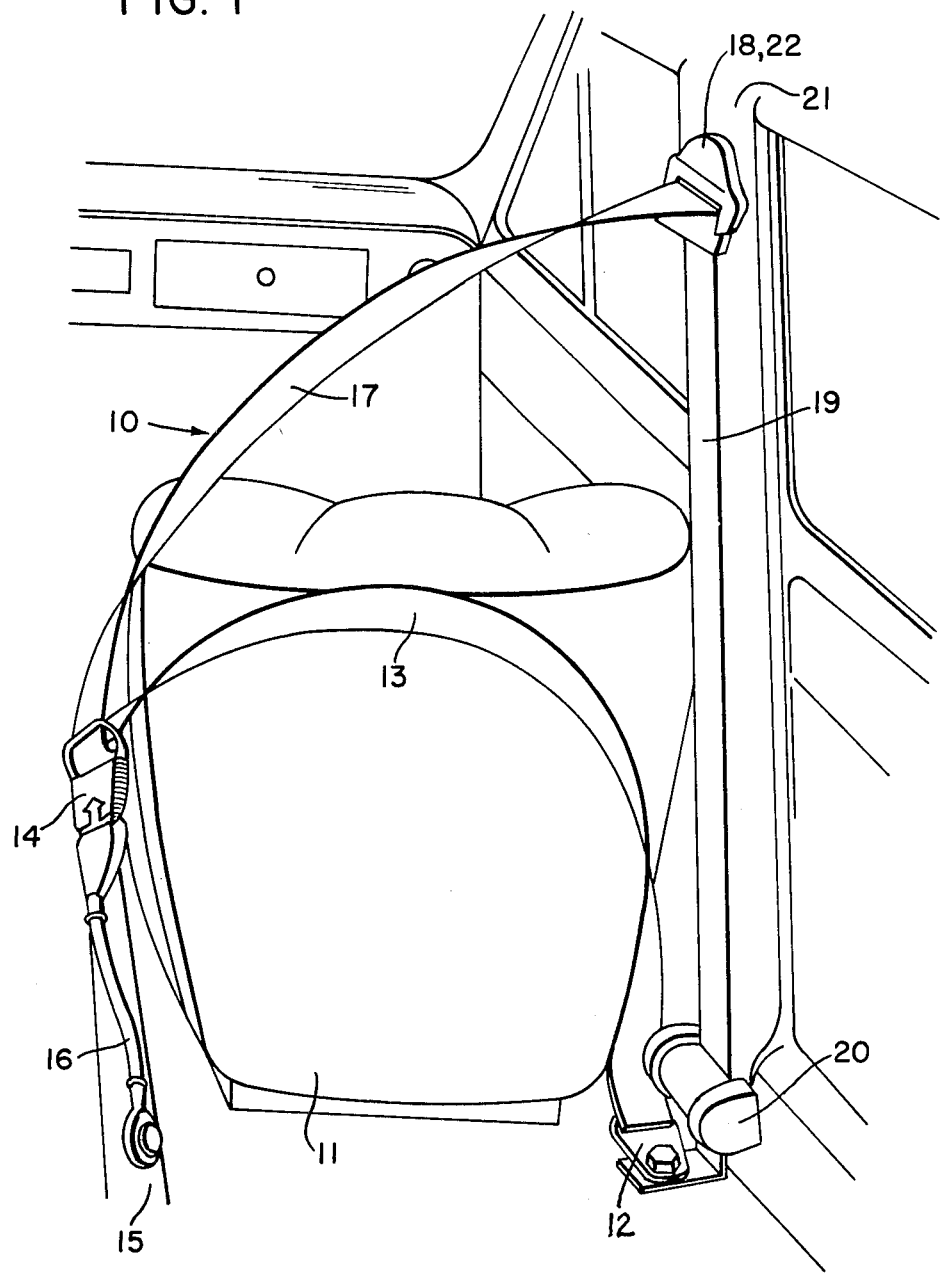
FIG. 1 is a diagrammatic view of a safety belt system.

The safety belt system of the present invention is characterized primarily in that the clamping mechanism is movably guided along the previously mentioned structural part of the vehicle, and in that a control or drive mechanism is provided for this movement of the clamping mechanism.

Pursuant to one preferred embodiment of the present invention, a pressurized-gas-driven piston unit is provided along the structural part of the vehicle as the control mechanism for effecting the movement of the clamping mechanism. The propellant charge of the piston unit is activated by a sensor connected with the vehicle. By an appropriate connection of the piston unit with the activator for the clamping mechanism, there is assured that the clamping action of the clamping mechanism will also be activated indirectly by the sensor. Appropriate construction of the piston unit is provided in order to initially effect the clamping action, and only after a time delay thereafter to effect the longitudinal movement of the clamping mechanism and hence tightening of the belt. After the tightening process has terminated, the clamping mechanism engages in an arresting housing, so that the arresting or retention of the belt is not released upon subsequent pulling or tension on the belt upon simultaneous reduction of the gas pressure in the control mechanism for the clamping mechanism.

Connected with the present invention is the advantage that as a result of clamping the safety belt in the vicinity of the guide fitting, the length of belt which might eventually be involved in an elongation is only approximately two-thirds of the overall length of the three-point safety belt, thus eliminating a considerable amount of the belt elongation. At the same time, however, the belt is tightened by the longitudinal movement of the clamping mechanism, thus eliminating the belt slack at the body of the strapped-in person. In so doing, the tightening force is applied considerably closer to the guide fitting, whereby the entire force is available for eliminating the belt slack.

Furthermore, with an active activation of the clamping mechanism, as provided with the preferred embodiment, the present invention permits the arresting mechanism of the belt winding mechanism to be considerably weaker, and possibly to even be dispensed with entirely, since the entire force exerted by the forward shifting of the strapped-in person when an accident occurs is now absorbed by the clamping mechanism and is thus kept from the belt winding mechanism. This makes it possible to have a simplified and more economical construction of the belt winding mechanism. Thus, the belt-sensitive arresting system in the belt winding mechanism can be omitted, since the arresting of the belt is effected by the vehicle sensor and the clamping mechanism.

Pursuant to specific advantageous features of the present invention, the clamping action of the clamping mechanism can be activated by pulling on the belt. The clamping action could also be activated by a sensor connected with the vehicle.

The activation of the drive or control mechanism can be effected a given period of time after the activation of the clamping mechanism. Alternatively, activation of the control mechanism can be effected simultaneous with the activation of the clamping mechanism.

The clamping mechanism may be disposed in the vicinity of the upper mounting or guide fitting, and may be movable in the direction toward the belt winding mechanism.

A piston unit which is acted upon by pressure medium may be provided as the control mechanism for the movement of the clamping mechanism. The clamping mechanism may be mounted on the upper end of a piston rod which is movable along the structural part of the vehicle; a piston mounted on the lower end of the aforementioned piston rod may be accommodated in a guide tube which, in turn, can be mounted on the structural part of the vehicle via fittings. A propellant charge may be disposed in the guide tube between the upper end thereof and the piston, which in the rest position is near the upper end of the guide tube; the propellant charge may be connected with the vehicle sensor via leads. Below the piston when the latter is in the rest position, the guide tube may be provided with a constriction. Alternatively, the piston may be held in its rest position by shear pins which extend through the piston and the wall of the guide tube.

A gas-permeable connection may be provided between the guide tube and the clamping mechanism, with the piston rod being provided with a central longitudinal bore, the transverse bores in the vicinity of its connection to the piston of the guide tube. The upper end of the longitudinal bore may open into a piston chamber provided in the clamping mechanism; a further piston which is movable transverse to the piston rod may be disposed in the piston chamber; the outside of this piston may support a clamping jaw. The back side of this further piston may be provided with a piston rod which extends out of the clamping mechanism.

The upper mounting fitting of the guide tube may be constructed as an upwardly open arresting housing for the clamping mechanism, with the latter, when the clamping jaws thereof are closed, being adapted to be introduced into the arresting housing. Arresting means may be provided in the arresting housing for securely holding the clamping mechanism in position therein.

The clamping mechanism may be disposed on the upper end of the piston rod, and the clamping jaws may be disposed on both sides of, and movable relative to, the piston rod by means of transverse links which are connected to the piston rod. The lower end of the piston rod may be connected to the control mechanism. The piston rod may be guided in a positive guide which narrows in the downward direction. The interior of the positive guide may be provided with arresting means which prevent the upward movement of the clamping mechanism.

It is also possible to provide a drive cable as the control mechanism for the movement of the clamping mechanism. One end of the drive cable may be connected to the clamping mechanism, and the other end may be connected to a pyrotechnical piston unit. In the region between the clamping mechanism and the pyrotechnical piston unit, the drive cable may be guided and deflected in the B-column via an antifriction member.

DESCRIPTION OF PREFERRED EMBODIMENTS

Referring now to the drawings in detail, the three-point safety belt 10 for the passenger seat 11 of an automobile or other vehicle comprises an outer bottom fitting 12, a lap belt portion 13 which proceeds from the fitting 12, a belt lock or buckle 14 having an anchor cable 16 which is mounted on the drive shaft housing 15 of the vehicle, a shoulder or chest belt portion 17, an upper guide fitting 18, a vertical belt section 19, and a belt winding mechanism 20. The belt 10, which includes the sections 13, 17, and 19, comprises a single continuous piece which is continuously adjustably guided about the buckle 14. In the region of the guide fitting 18, which is disposed approximately at the level of the head of the person who is to be buckled in and in the B-column of the body of the vehicle, there is disposed a clamping mechanism 22 which is also mounted on or in the B-column 21. The belt section 19 can extend along or in the B-column, and the belt winding mechanism 20 can either be exposed or can be covered.

Figure 2:
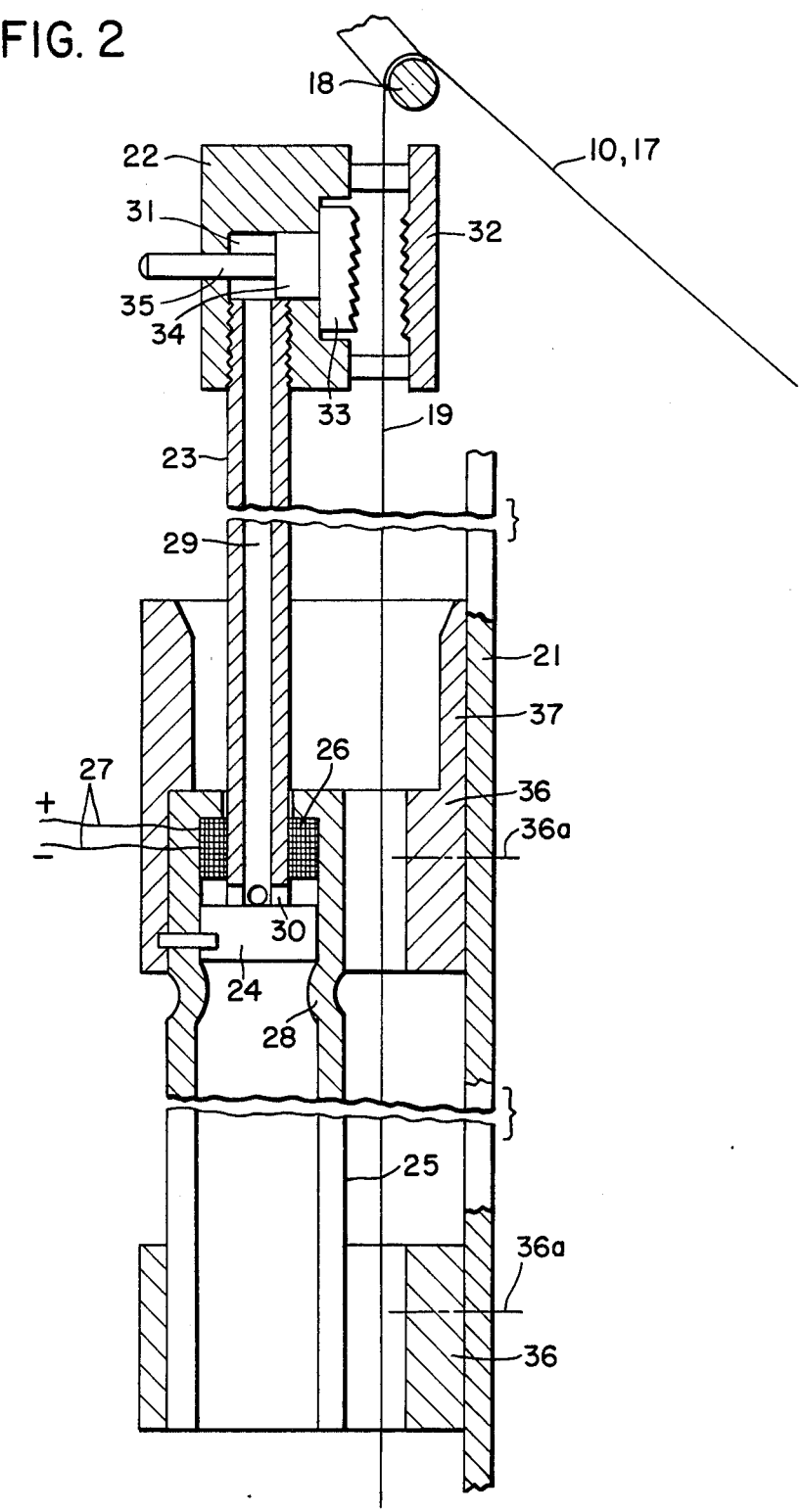
FIG. 2 is a longitudinal schematic section through one inventive embodiment of a clamping mechanism having a control mechanism.
Figure 3:
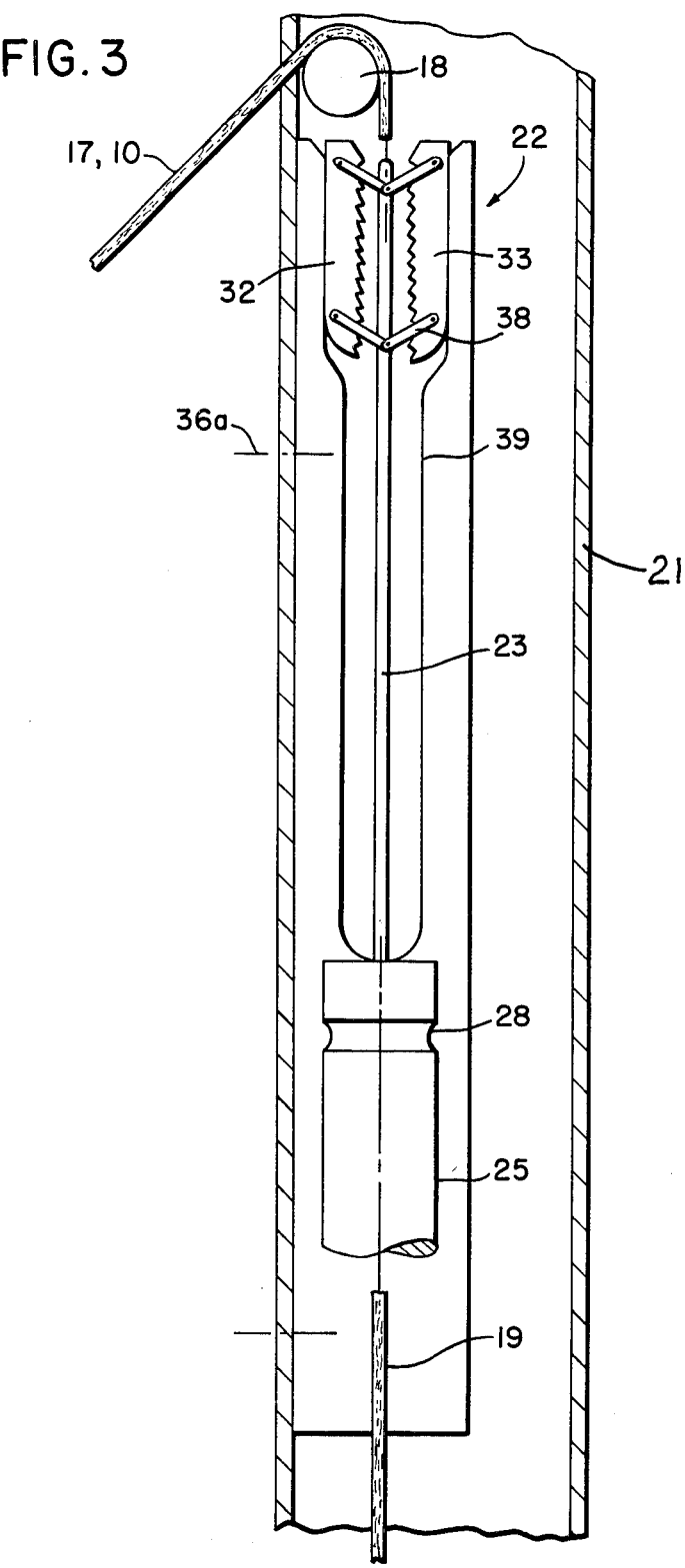
FIG. 3 is a schematic longitudinal section of another inventive embodiment of a clamping mechanism which has a control mechanism.

In the embodiments illustrated in FIGS. 2 and 3, the belt winding mechanism 20, the vertical belt section 19, and the guide fitting 18 are disposed within the B-column 21, so that the shoulder belt 17 of the safety belt system 10 exits the B-column 21 approximately at the level of the head of the person who is to be buckled in, in which connection it is furthermore possible to provide a device for adjusting the height of the guide fitting 18. This guide fitting 18 is structurally separate from the clamping mechanism 22.

The embodiment shown in FIG. 2 schematically illustrates a clamping mechanism 22 for the belt section 19; the clamping mechanism can be deplaceably moved or adjusted within the B-column 21, and is provided with a drive or control mechanism for this purpose. In particular, the clamping mechanism 22 is mounted at the upper end of a piston rod 23, at the lower end of which is seated a piston 24 which in turn is guided within a guide tube 25. The length of the piston rod 23, i.e. the distance between the clamping mechanism 22 and the guide tube 25, is determined by the amount of belt tightness which is desired. A propellant charge 26 is disposed in the region between the upper end of the guide tube 25 and the rest position of piston 24. The propellant charge 26 is connected via leads 27 to a sensor which is associated with the vehicle and is adapted to activate the charge 26. Below the piston 24, the guide tube 25 is additionally provided with a constriction 28.

The piston rod 23 is provided with a central longitudinal bore 29, as well as with transverse bores 30 at its lower end at the connection to the piston 24. At the upper end of the piston rod 23, the longitudinal bore 29 opens into a piston chamber 31 which is provided in the clamping mechanism 22. The clamping mechanism 22 is provided with a fixed clamping jaw 32, which is disposed in the orientation of the belt 19, and a movable clamping jaw 33, which is movable transverse to the clamping jaw 32 and hence the belt 19; the belt 19 is guided and can be clamped between the jaws 32 and 33. For this purpose, the clamping jaws 32 and 33 are provided with serrations on those sides which face one another.

The movable clamping jaw 33 is seated on the front end of a piston 34 which is movably guided in the piston chamber 31. On that side remote from the clamping jaw 33, a piston rod 35 of the piston 34 projects out of the clamping mechanism 22.

The guide tube 25 is mounted on the B-column 21 by means of fittings 36 and mounting means 36a which are provided at the upper and lower ends of the guide tube 25. If the mounting conditions are unfavorable, the lower end fitting 36 can also serve as a further guide fitting for the belt coming from the belt winding mechanism. The upper end fitting 36 continues as an upwardly open arresting housing 37; the inside space of the arresting housing 37 is dimensioned in such a way that when the clamping action is activated, the abutting clamping jaws 32 and 33 of the clamping mechanism 22 can be introduced into the housing 37.

The clamping mechanism of the above-described embodiment operates as follows: As a result of the ignition of the propellant charge 26 as a result of activation by the vehicle sensor, the resulting pressurized gas expands and initially enters the transverse bores 30 of the piston rod 23, since the piston 24, due to its being fixed in the guide tube 25 by the constriction 28, cannot yet be moved downwardly. A further protection against having the piston rod 23, and hence the clamping mechanism 22, move downwardly is the piston 34, which supports the movable clamping jaw 33 and has the piston rod 35 which is the open condition of the clamping mechanism 22 projects out of the latter; the free end of the piston rod 35 engages a member which is fixed to the vehicle.

Via the transverse bores 30 and the longitudinal bore 29 in the piston rod 23, the pressurized gas is guided into the piston chamber 31 in the clamping mechanism 22, where it presses the piston 34, along with the clamping jaw 33, in the direction toward the clamping jaw 32. At the same time, the piston rod 35 moves out of the member which is fixed to the vehicle, and basically becomes flush with the mechanism 22. After the movement of the piston 34 is completed, there is built-up by the flowing gas a pressure which is sufficient to subsequently push the piston 24 past the constriction 28 in the guide tube 25 downwardly into an end position. In this manner, the clamping mechanism 22, along with the clamped belt, are moved downwardly until they enter the arresting housing 37; in this way, the belt is tightened. The arresting housing 37 is constructed in such a way that the clamping mechanism 22 in its end position in the housing is still held in the clamped position even after the gas pressure drops.

In the embodiment just described, instead of the constriction 28 for securing the piston 24 in the guide tube 25, other arresting means can also be used, for example shear pins which can be connected with the wall of the guide tube 25 through the piston 24, and which shear off after a predetermined gas pressure is exerted on the piston 24, thus making it possible for the piston 24 to move downwardly and to tighten the belt.

In the inventive embodiment illustrated in FIG. 3, the clamping jaws 32 and 33 of the clamping mechanism 22 are disposed on both sides of the piston rod 23, are movable toward one another, and are respectively connected to the piston rod 23 via transverse links 38. The lower end of the piston rod 23 terminates in the guide tube 25, where, in a manner similar to that already described in connection with the previous embodiment, there can be provided a drive or control mechanism for the downward movement of the piston rod 23. In the embodiment of FIG. 3, the clamping mechanism 22 is disposed next to the belt 19, since the belt 19 extends in the same plane as the piston rod 23, and is mounted via mounting means 36a to the B-column 21 of the vehicle. The piston rod 23 is guided in a positive guide 39 which is tapered from the top toward the bottom; the transition to the tapered portion of the guide 39 is rounded off, as are those ends of the clamping jaws 32, 33 which face the control mechanism 23, 24, 25.

In this embodiment, clamping of the belt and downward movement of the clamping mechanism is achieved at the same time, and in particular as follows: After the propellant charge has been activated, the resulting pressurized gas moves the piston rod 23 downwardly. Due to the movable connection of the two clamping jaws 32, 33 to the piston rod 23, the clamping jaws 32, 33 are moved downwardly, whereby they enter the narrower portion of the positive guide 39, which moves the jaws 32, 33 toward one another to effect clamping of the belt 19. As a result of the subsequent downward movement in the positive guide 39 of the jaws 32, 33 in their clamped position, the belt is pulled appropriately ttight. At the same time, appropriate arresting means are provided to preclude a reverse upward movement of the clamping mechanism 22 in the positive guide 29, so that the belt is securely held.

In addition to the previously described embodiments, the present invention can also be implemented by undertaking the positive guidance of the movable clamping mechanism 22 in the B-column 21 by guide means disposed to the side thereof. Basically, separate activating and operating or control mechanisms can be provided for the clamping mechanism 22 on the one hand and the movement thereof on the other hand. Thus, in particular, the control mechanism which is acted upon by pressure medium can be replaced by a different form of control, for example a cable drive.

Figure 4:
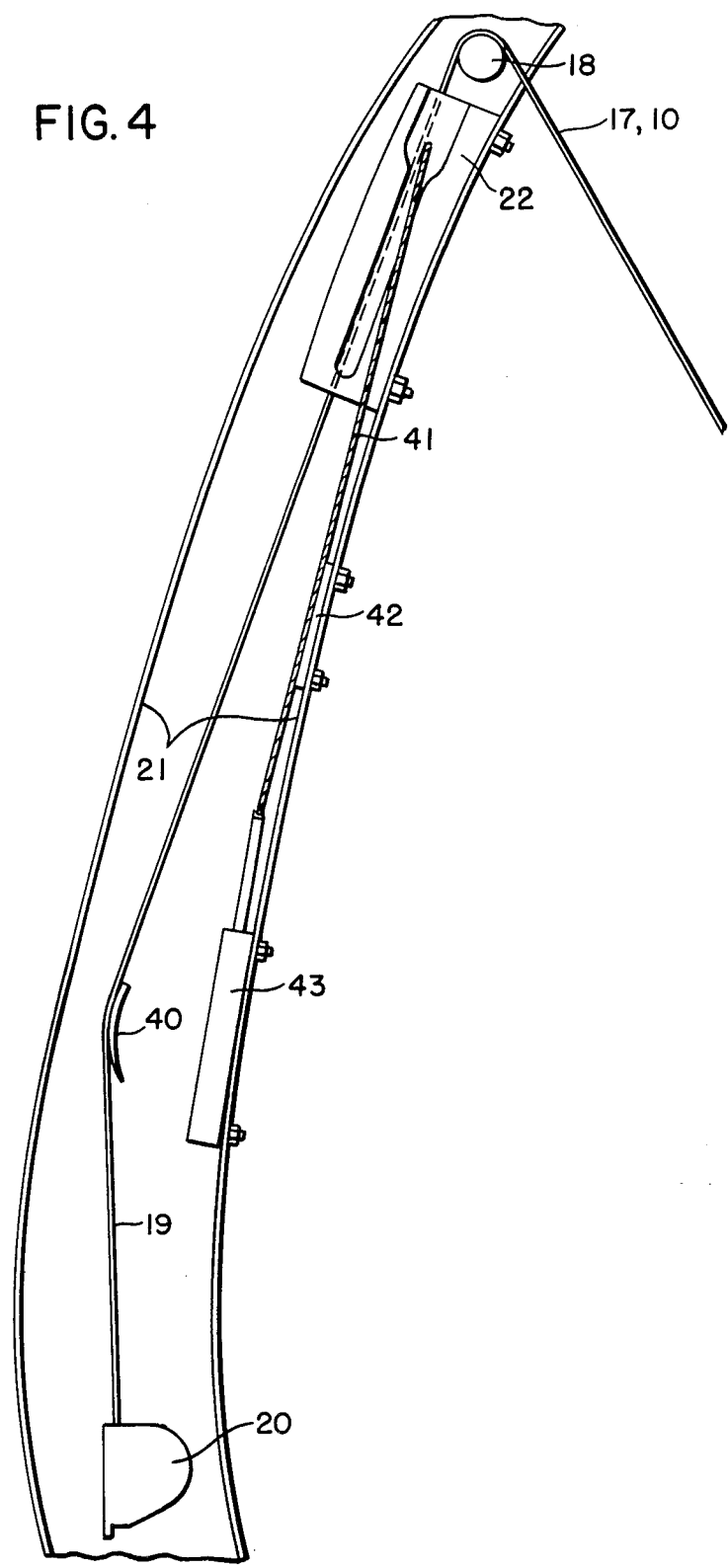
FIG. 4 is a further inventive embodiment of a clamping mechanism which has a control mechanism.

Such a type of drive or control mechanism for the clamping mechanism in the form of a cable drive is illustrated in the embodiment of FIG. 4. The cable drive is particularly suitable for installation of the inventive clamping mechanism in vehicles having a curved B-column, in which no control mechanisms having rigid and linearly guided components can be used for the clamping mechanism.

From the belt winding mechanism 20, which is built into the lower end of the B-column 21, the belt section 19 of the safety belt 10 is initially guided upwardly over an antifriction member 40 through the clamping mechanism 22, and is then guided further out of the B-column 21 over the guide fitting 18 in the direction of the person who is to be buckled in. The member 40 assures a friction-free adaptation of the path of the belt to the curved shape of the B-column 21, while the clamping mechanism 22 can, for example, be constructed in conformity to the embodiment of a clamping mechanism as illustrated and explained in detail in connection with FIG. 3.

The piston rod 23, which with this embodiment is short, along with the transverse links 38 connected thereto, is connected at its lower end with a drive cable 41 which is guided along the inside of the B-column 21 via an antifriction member 42 up to a pyrotechnical piston unit 43. The member 42 similarly assures a friction-free path of the drive cable 41 along the curved B-column 21. The pyrotechnical piston unit 43 can be constructed in a manner similar to the control mechanism described in connection with FIG. 2, namely one which comprises a guide tube 25, a piston 24, a piston rod 23 which in this case is constructed as a connection for the drive cable 41, and a propellant charge 26; the same retaining elements 28 can be provided.

Finally, it is not absolutely necessary that the activation of the belt clamping and the control mechanism be regulated by a sensor. For example, the clamping mechanism can also be made operative in a known manner by a suitably strong pull on the belt strap after a slight blocking of the belt winding mechanism; the gripping of the clamping jaws then activates the control mechanism for the movement of the clamping mechanism for tightening the belt.

Finally, the inventive safety belt system can also be advantageously implemented with so-called seat-integrated safety belts, where the belt winding mechanism, the belt buckle, and the belt guidance are mounted on the seat itself. In such a case, the additional parts of the safety belt system, namely the clamping mechanism as well as its movement track, must also be provided on the seat; however, this does not require any structural approaches which differ considerably from those already described.

The present invention is, of course, in no way restricted to the specific disclosure of the specification and drawings, but also encompasses any modifications within the scope of the appended claims.

What we claim is:

1. A safety belt system for a vehicle, said system including a three-point safety belt, a self-locking belt winding mechanism which is mounted on a structural part of said vehicle, and a clamping mechanism for said belt, said clamping mechanism being disposed on or in said structural part, and having clamping jaws, at least one of which is movable;

the improvement therewith wherein said clamping mechanism is movably guided relative to said structural part; and including a control mechanism for effecting movement of said clamping mechanism, and which includes, as said control mechanism for effecting movement of said clamping mechanism, a piston unit which is acted upon by a pressure medium, said piston unit including a piston rod which has an upper and lower end, and is movable along said structural part of said vehicle, with said clamping mechanism being connected to said upper end of said piston rod; said unit further including a guide tube, as well as a piston which is connected to said lower end of said piston rod and is accommodated in said guide tube; and fitting means provided for mounting said guide tube to said structural part of said vehicle.

2. A safety belt system according to claim 1, in which said guide tube has an upper end in the vicinity of said lower end of said piston rod, with a propellant charge being disposed in said guide tube between said upper end thereof and said piston, which in a rest position thereof is disposed near said upper end of said guide tube; leads are provided for connecting said propellant charge to a vehicle sensor.

3. A safety belt system according to claim 2, in which said guide tube is provided with a constriction below the position occupied by said piston when the latter is in the rest position thereof.

4. A safety belt system according to claim 2, which includes shear pins which extend through said guide tube and said piston for securing the latter in the rest position thereof.

5. A safety belt system according to claim 2, in which, to provide communication for the passage of gas from said guide tube to said clamping mechanism, said piston rod is provided with a central longitudinal bore and, in the vicinity of a connection thereof to said piston, with transverse bores.

6. A safety belt system according to claim 5, in which said clamping mechanism is provided with a piston chamber, with the upper end of said longitudinal bore opening into said piston chamber; a further piston is disposed in said piston chamber in such a way as to be movable transverse to said piston rod; said further piston has a back side which faces said piston chamber, and an outer side which is remote from said piston chamber and supports one of said clamping jaws.

7. A safety belt system according to claim 6, in which said back side of said further piston is provided with a further piston rod which is adapted to extend out of said clamping mechanism.

8. A safety belt system according to claim 5, in which gas passage activates said control mechanism and said clamping mechanism.

9. A safety belt system according to claim 1, in which fitting means for mounting said guide tube in the vicinity of said lower end of said piston rod is in the form of an upwardly open arresting housing for receiving said clamping mechanism when said clamping jaws thereof are closed.

10. A safety belt system according to claim 9, in which said arresting housing is provided with arresting means for securely holding said clamping mechanism in position in said housing.

11. A safety belt system according to claim 9 in which said control mechanism is activated simultaneously with the activation of said clamping mechanism.

12. A safety belt system for a vehicle, said system including a three-point safety belt, a self-locking belt winding mechanism which is mounted on a structural part of said vehicle, and a clamping mechanism for said belt, said clamping mechanism being disposed on or in said structural part, and having clamping jaws, at least one of which is movable;

the improvement therewith wherein said clamping mechanism is movably guided relative to said structural part; and including a control mechanism for effecting movement of said clamping mechanism, and which includes, as said control mechanism for effecting movement of said clamping mechanism, a piston unit which is acted upon by a pressure medium, said piston unit including a piston rod which has an upper and lower end, with said clamping mechanism being connected to said upper end of said piston rod; said clamping jaws are disposed on both sides of, and are movable relative to, said piston rod by means of transverse links connected to said piston rod.

13. A safety belt system according to claim 12, in which said lower end of said piston rod is connected to said control mechanism.

14. A safety belt system according to claim 12, which includes a downwardly tapered positive guide in which said piston rod is guided.

15. A safety belt system according to claim 14, in which the interior of said positive guide is provided with arresting means for preventing upward movement of said clamping mechanism.

16. A safety belt system according to claim 1, in which said structural part of said vehicle is provided with an upper mounting or guide fitting, with said clamping device being disposed in the vicinity of said mounting or guide fitting and being movable in the direction toward said belt winding mechanism.

17. A safety belt system for a vehicle, said system including a three-point safety belt, a self-locking belt winding mechanism which is mounted on a structural part of said vehicle, and a clamping mechanism for said belt, said clamping mechanism being disposed on or in said structural part, and having clamping jaws, at least one of which is movable;

the improvement therewith wherein said clamping mechanism is movably guided relative to said structural part; and including a control mechanism for effecting movement of said clamping mechanism, said structural part of said vehicle being provided with an upper mounting or guide fitting, with said clamping device being disposed in the vicinity of said mounting or guide fitting and being movable in the direction toward said belt winding mechanism; which includes, as said control mechanism for effecting movement of said clamping mechanism, a drive cable having one end connected to said clamping mechanism, and having another end connected to a pyrotechnical piston unit.

18. A safety belt system according to claim 17, in which said structural part of said vehicle is a B-column; and which includes an antifriction member, with said drive cable, in the region between said clamping mechanism and said pyrotechnical piston unit, being guided and deflected in said B-column by means of said antifriction member.

19. A safety belt system according to claim 17, which includes, as said control mechanism for effecting movement of said clamping mechanism, said piston unit which is acted upon by a pressure medium.

* * * * *